(12) United States Patent
Hoof van

(10) Patent No.: US 9,264,595 B2
(45) Date of Patent: Feb. 16, 2016

(54) ARRANGEMENT FOR ADJUSTABLY MOUNTING A CAMERA

(75) Inventor: Berry Hoof van, Helmond (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/354,754

(22) PCT Filed: Oct. 27, 2011

(86) PCT No.: PCT/EP2011/068853
§ 371 (c)(1),
(2), (4) Date: Apr. 28, 2014

(87) PCT Pub. No.: WO2013/060371
PCT Pub. Date: May 2, 2013

(65) Prior Publication Data
US 2014/0253798 A1    Sep. 11, 2014

(51) Int. Cl.
| H04N 5/225 | (2006.01) |
| G03B 17/14 | (2006.01) |
| G03B 17/08 | (2006.01) |
| G03B 3/12 | (2006.01) |
| G03B 17/12 | (2006.01) |
| G08B 13/196 | (2006.01) |

(52) U.S. Cl.
CPC ............... *H04N 5/2254* (2013.01); *G03B 3/12* (2013.01); *G03B 17/08* (2013.01); *G03B 17/12* (2013.01); *G03B 17/14* (2013.01); *G03B 2205/0053* (2013.01); *G08B 13/19619* (2013.01)

(58) Field of Classification Search
None
See application file for complete search history.

(56) References Cited

U.S. PATENT DOCUMENTS

| 5,418,567 | A | 5/1995 | Boers et al. | |
| 7,598,996 | B2 * | 10/2009 | Wenstrand et al. | 348/353 |
| 2005/0175335 | A1 * | 8/2005 | Kajino et al. | 396/427 |
| 2006/0187338 | A1 * | 8/2006 | May et al. | 348/375 |
| 2008/0211955 | A1 | 9/2008 | Avital et al. | |

FOREIGN PATENT DOCUMENTS

| CN | 1450296 | 10/2003 |
| CN | 2728128 | 9/2005 |
| CN | 201557176 | 8/2010 |
| EP | 0931972 | 7/1999 |
| EP | 1729269 | 12/2006 |

OTHER PUBLICATIONS

International Search Report for Application No. PCT/EP2011/068853 dated Jul. 20, 2012 (2 pages).

* cited by examiner

*Primary Examiner* — Albert Cutler
(74) *Attorney, Agent, or Firm* — Michael Best & Friedrich LLP

(57) ABSTRACT

The invention provides for an adjustment arrangement (16) for adjusting a camera and a camera arrangement. The adjustment arrangement (16) comprises a turn plate (20), an upper turn plate (24) and a gear wheel (22) adapted to be placed dependent on a lens (28) used.

20 Claims, 7 Drawing Sheets

US 9,264,595 B2

ARRANGEMENT FOR ADJUSTABLY MOUNTING A CAMERA

BACKGROUND OF THE INVENTION

The invention provides for an adjustment arrangement for adjusting a camera and a camera arrangement comprising such an adjustment arrangement. The arrangement allows for adjusting the lens distance for setting the optical train of the camera.

Setting the lens distance is a major topic in camera systems, especially in a camera arrangement comprising a camera and a housing enclosing the camera. Usually, such a housing comprises an aperture defining the line of sight of the camera enclosed in the housing. A particular camera system known comprising a camera and a housing is a so-called dome camera.

A dome camera is a monitoring camera used in a protective system. Usually, the dome camera is incorporated within a hemispherical shaded dome made of plastics. Said dome is provided for protecting the camera against damage and vandalism.

Dome cameras have been used at flashpoints as well as in public means of transport both interior and exterior. A main advantage of such a dome camera is that it is not possible to determine the orientation of the camera hidden by the shaded dome. It is to be noted that in a dome camera the camera can be moved with respect to the dome forming the housing of the camera.

Document EP 1 729 269 A1 discloses a dome with optical correction for use in a vandal proof surveillance camera system. The dome comprises a transparent optical material, which itself comprises an inner surface and an outer surface. Both surfaces are essentially rotational symmetrical and exhibit non-spherical shapes. Said dome is used in a vandal proof surveillance camera system comprising said dome and a camera being pivotably mounted inside the dome.

It is to be noted that optical train is also referred to as optical assembly and is the arrangement of lenses to guide the line of sight. The position and angle of lenses are adjusted to guide the line of sight through the path required.

In a camera comprising a housing as illustrated above, it is a problem to be able to use the same parts in the optical train assembly to enable different lens settings and even to use different lenses to obtain the optimum lens configuration in the camera. The MBF (motorised back focus) also connects in this flexible setting.

SUMMARY OF THE INVENTION

The invention provides for an adjustment arrangement for adjusting a camera and a camera arrangement.

The construction saves costs in parts and assembly and can be considered as a flexible module.

In one embodiment, the lens distance setting assembly is built of a turn plate, an upper turn plate, a gearwheel and a sprocket stick. The gearwheel can be positioned in bottom position or in top position dependent on the lens used. The same gearwheel is adapted to be placed in bottom or in top position between the turn plate and the upper turn plate.

The foregoing summary as well as the following detailed description of preferred embodiments of the invention will be better understood when read in conjunction with the appended drawings. For the purpose of illustrating the invention, embodiments of the invention are shown in the drawings. It should be understood however, that the invention is not limited to precise arrangements and instrumentalities shown.

It is self-evident that the features mentioned above and those which are still to be explained in the following text can be used not only in the respectively stated combination but also in other combinations or on their own without departing from the scope of the present invention.

BRIEF DESCRIPTION OF THE DRAWINGS

The invention will be described in more details with reference to the drawings given below, in which.

DETAILED DESCRIPTION

Figure 1:
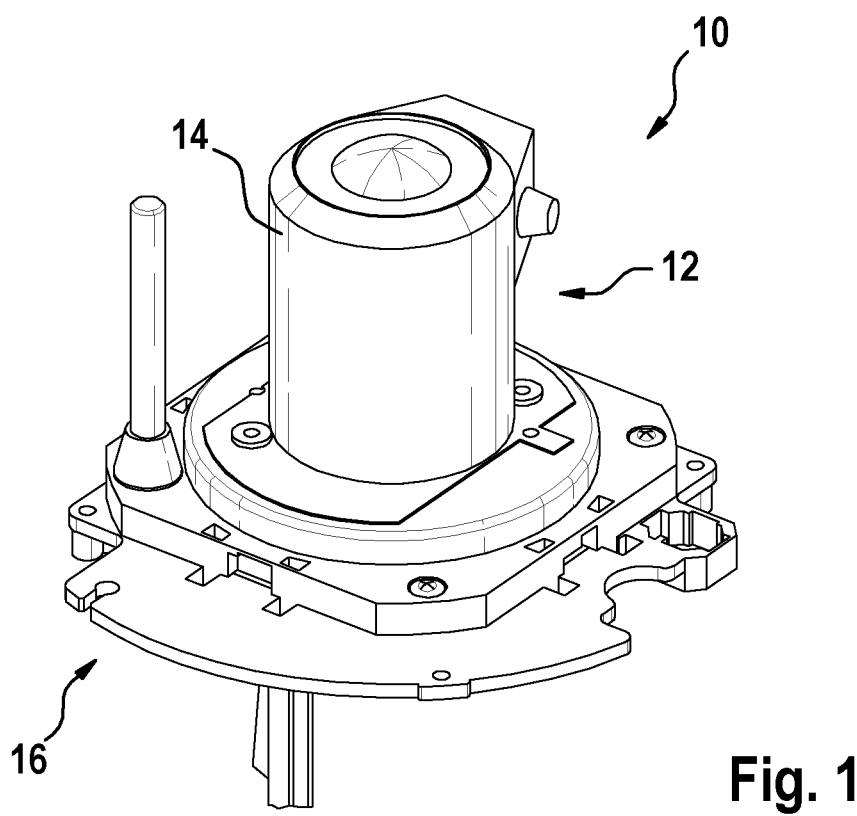
FIG. 1 shows a camera arrangement comprising a camera enclosed by a housing and mounted on a adjustment arrangement in top view.
Figure 2:
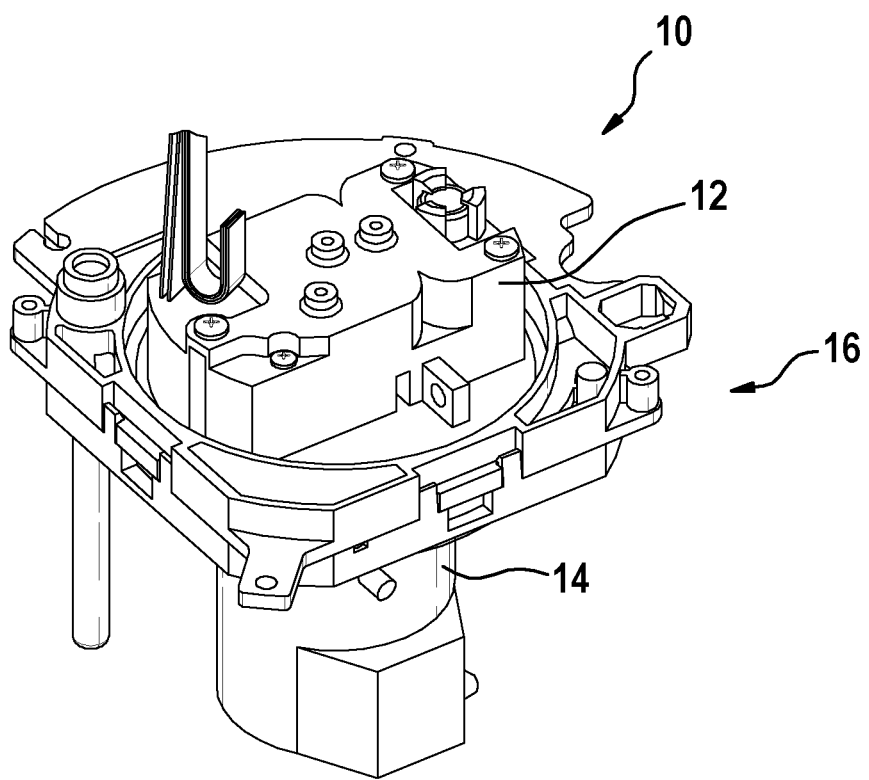
FIG. 2 shows the camera arrangement of FIG. 1 in bottom view.

FIG. 1 shows in top view a camera arrangement 10 comprising a camera 12 enclosed by a housing 14 mounted on an adjustment arrangement 16. FIG. 2 shows the camera arrangement 10 in bottom view.

Figure 3:
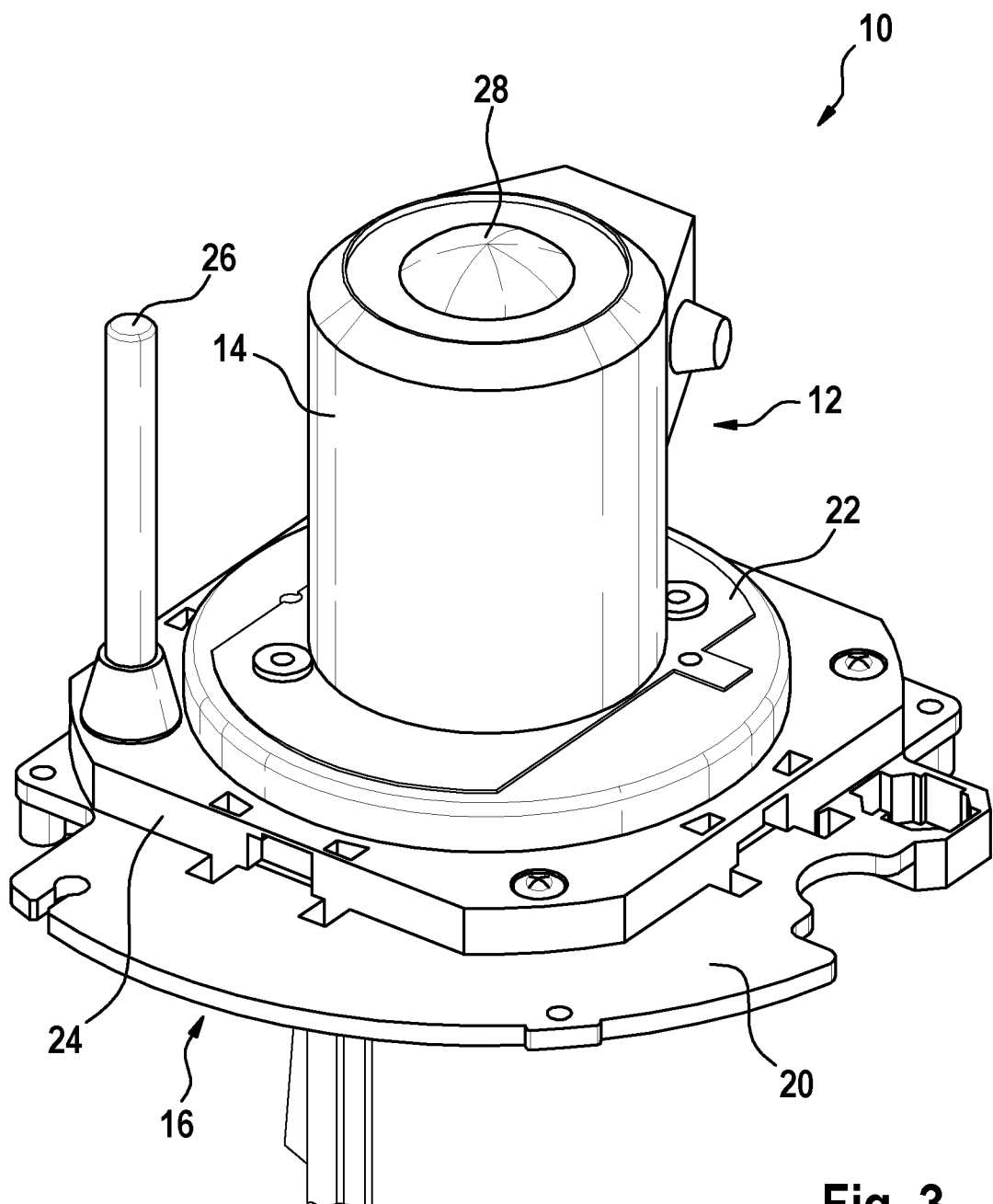
FIG. 3 shows the camera arrangement of FIG. 1 in greater detail.

FIG. 3 shows the camera arrangement 10 in greater detail, the adjustment arrangement 16 comprises a turn plate 20, a gearwheel 22, an upper turn plate 24, and a stick 26, in this embodiment a sprocket stick. The turn plate 20 centers and holds the gearwheel 22. The gearwheel 22 is formed as a cup with a base.

The housing 14 of the camera 12 comprises a lens 28 defining the line of sight of the camera.

Figure 4:
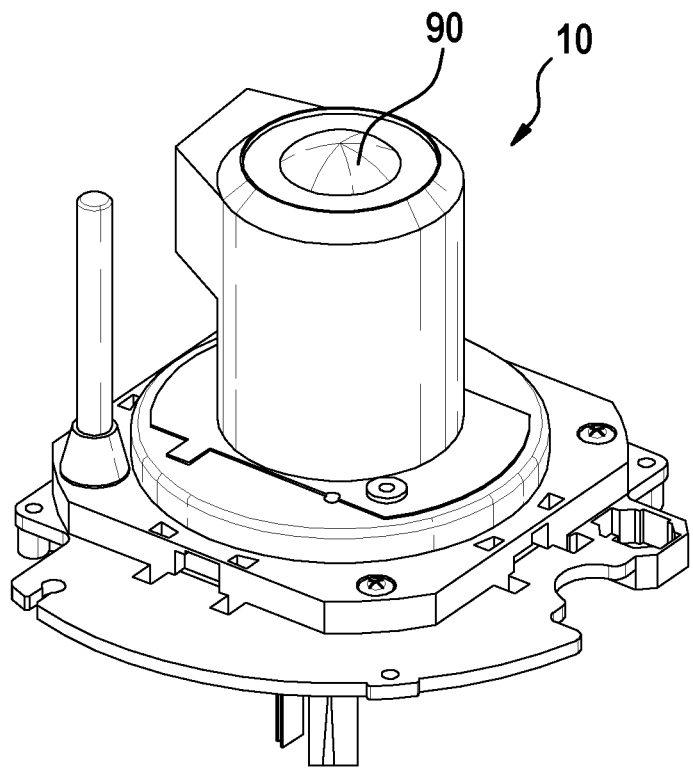
FIG. 4 shows the camera arrangement having a ultra wide lens.
Figure 5:
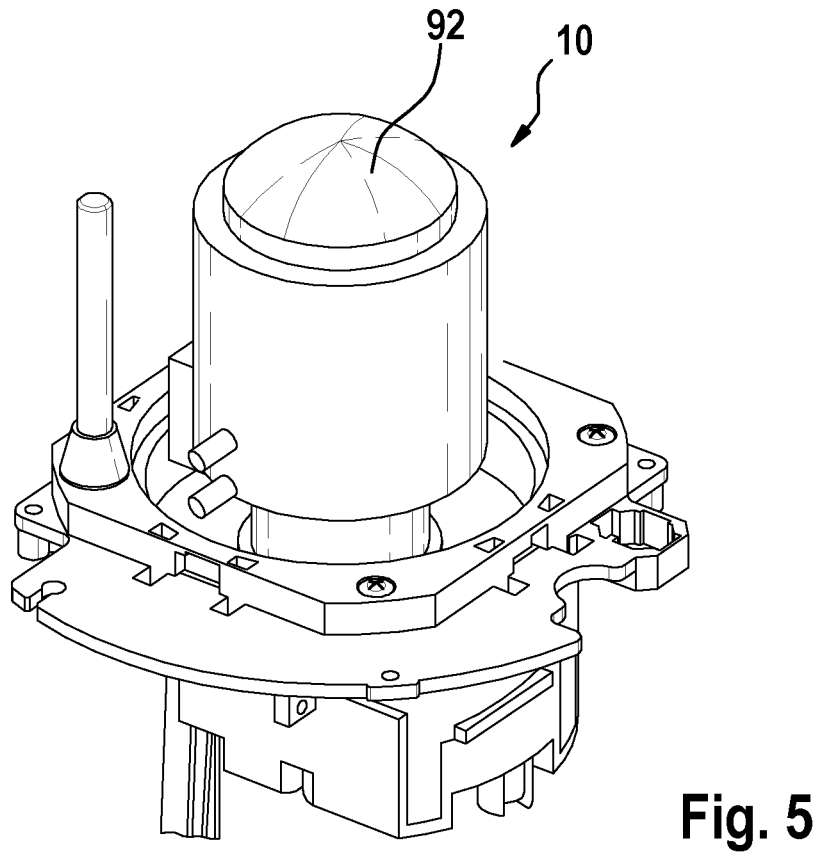
FIG. 5 shows the camera arrangement having a tele lens.

FIG. 4 shows the camera arrangement 10 setted for an ultra wide lens 90, FIG. 5 shows the arrangement 10 setted for a tele lens 92.

Figure 6:
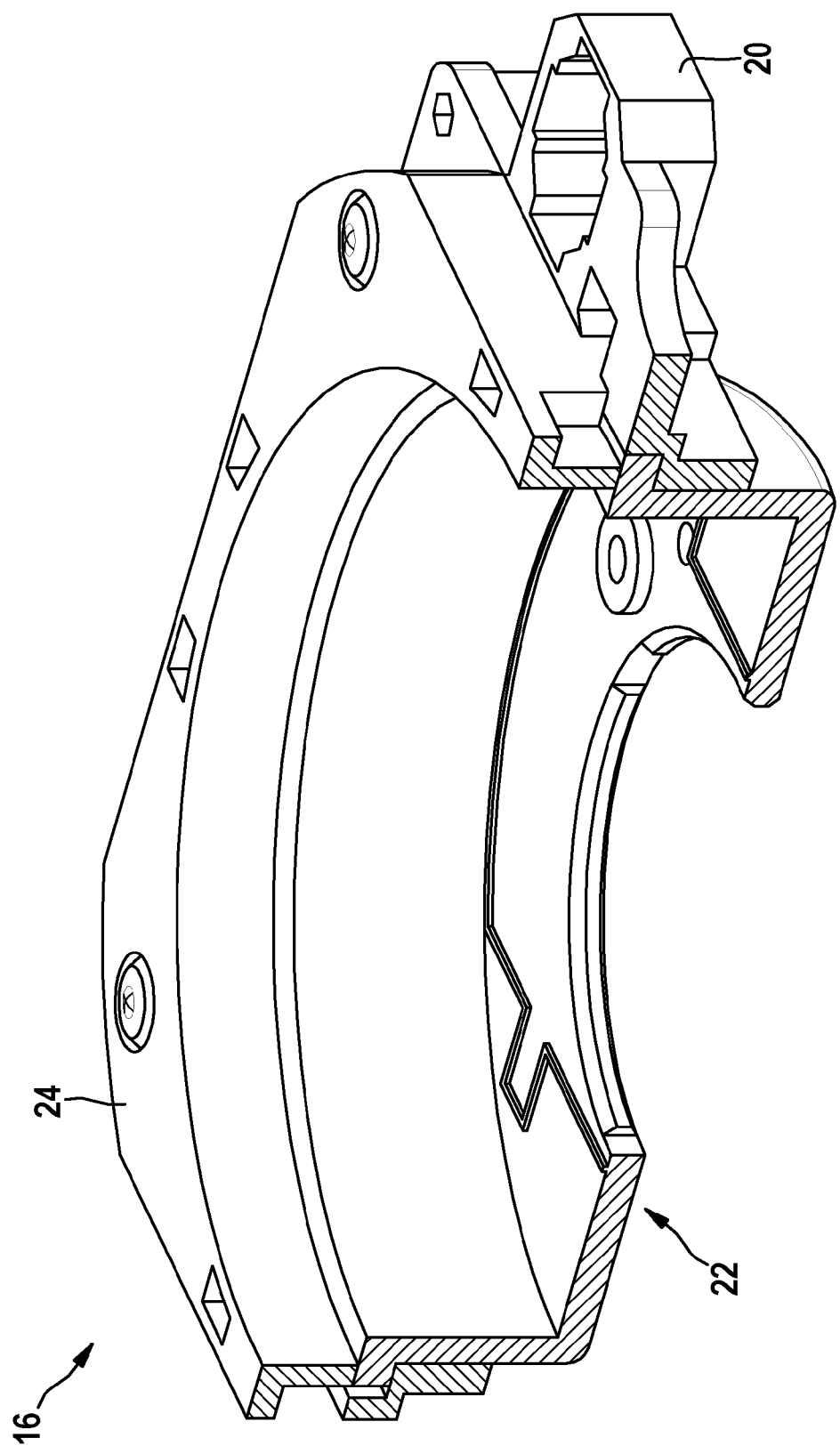
FIG. 6 shows a section of the arrangement illustrating the setting for a tele lens.
Figure 7:
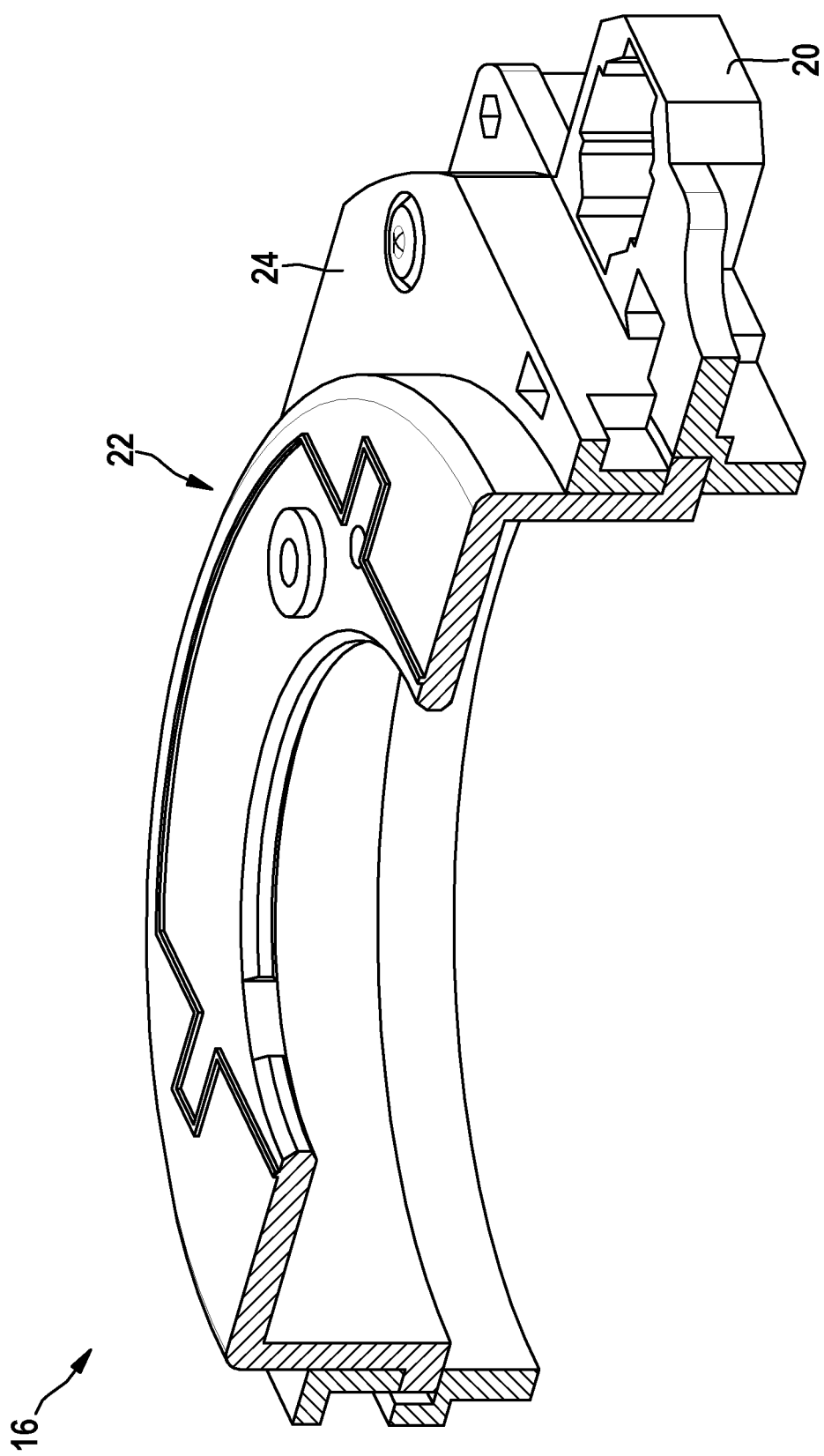
FIG. 7 shows a section of the adjustment arrangement illustrating the setting for an ultra wide lens.

FIG. 6 shows a section of the adjustment arrangement 16 comprising the turn plate 20, the upper turn plate 24, and the gearwheel 22 placed in bottom position to accommodate a tele lens on the inside of the base of the gearwheel 22. FIG. 7 shows the adjustment arrangement 16 comprising a gearwheel 22 placed in top position to accommodate an ultra wide lens on the outside of the base of the gearwheel 22.

It is to be noted that the gearwheel 22 can be positioned dependent on the lens 28 used. It is to be noted that gearwheels 22 of different heights can be used to accommodate more different lens types. These gearwheels 22 can be swapped in the assembly by default.

Figure 8:
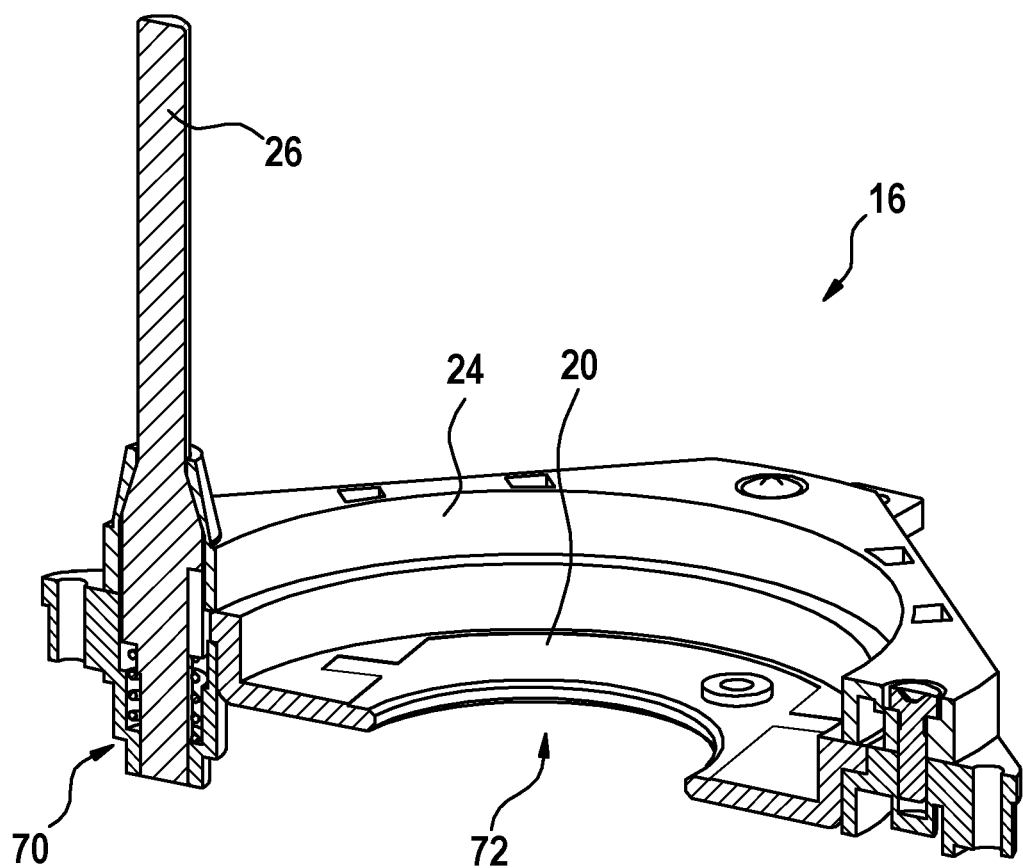
FIG. 8 shows a section of the adjustment arrangement in a first operation condition.

FIG. 8 shows a section of the adjustment arrangement 16 comprising the turn-plate 20, the upper turn plate 24 and the sprocket stick 26. The sprocket stick 26 is loaded by a spring 70. Arrow 72 indicates position of the gearwheel (not shown).

The sprocket stick 26 shown is in a static position and locked in its "splines" by pressure of the spring 70 and will be blocking the teeth of the gearwheel. This secures the rotation block of the gearwheel.

Figure 9:
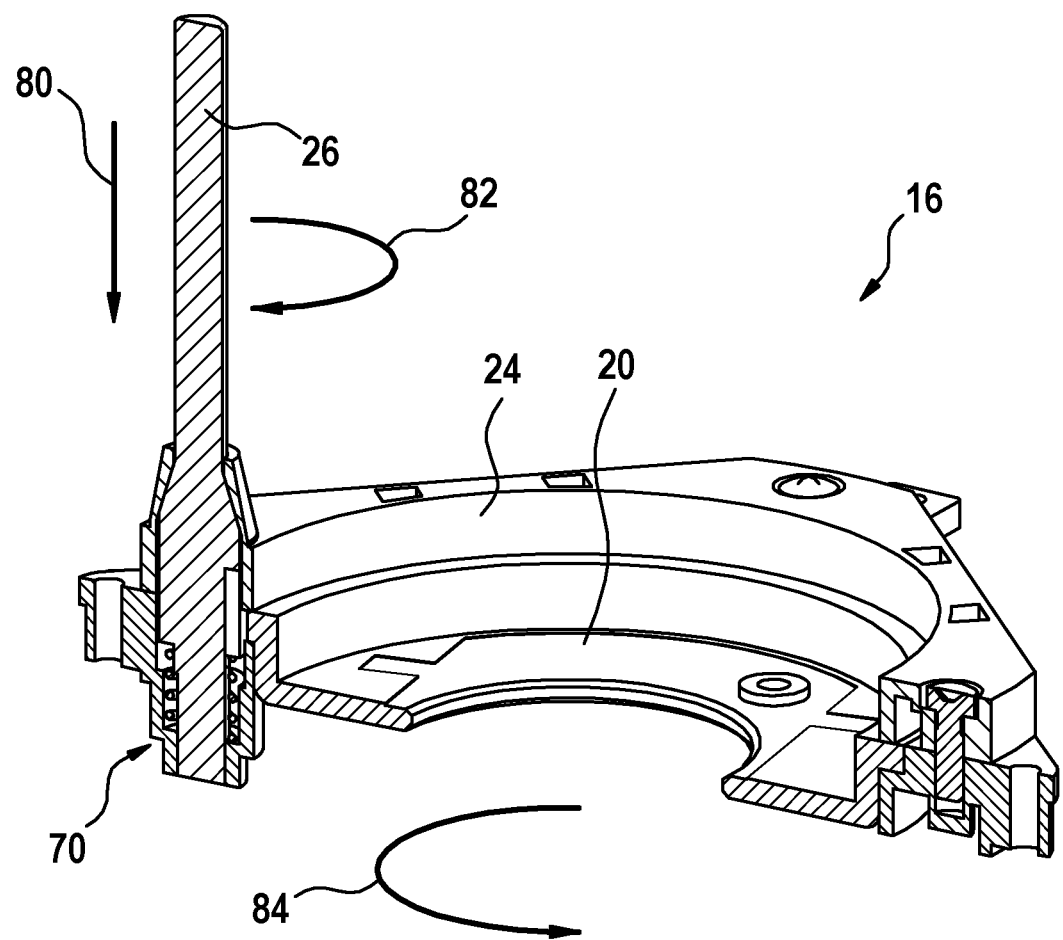
FIG. 9 shows the section of the adjustment arrangement of FIG. 8 in a second operation condition.

FIG. 9 illustrates the functional principle of the adjustment arrangement 16. By pushing the sprocket stick 26 downwards in direction of arrow 80 against the springload will cause the splines to be unlocked. Therefore, the sprocket stick 26 can be turned (arrow 82) to drive the gearwheel. The gearwheel will be unlocked and turned in direction of arrow 84.

The sprocket stick 26 can be made of molded POM, the upper turn plate 24 can be made of molded PC-ABS. Molded PC-ABS can be used for the turn plate 20, Molded POM can be used for building the gearwheel.

For turning the gearwheel the sprocket stick 26 is in contact to the circumference of the gearwheel, in this manner rotation of the sprocket stick 26 is transferred to the gearwheel. In one embodiment the sprocket stick 26 is provided with teeth meshing with teeth of the gearwheel.

Different methods for transferring rotation of the stick to the gearwheel are possible according to the invention, e.g. a chain, a belt cord and sprocket and teeth meshing. In case the rotation is transferred by meshing teeth, the stick is built as a sprocket stick. In case the rotation is transferred by a chain or a cord belt, the stick can be built as a sprocket stick. However, in that case the stick does not have to be built as a sprocket stick.

What is claimed is:

1. An adjustment arrangement for adjusting a camera (12) enclosed by a housing (14), the adjustment arrangement (16) comprising a first turn plate (20), a second turn plate (24), and a gearwheel (22) including a cup having a base, the gearwheel (22) adapted to be placed dependent on a lens (28) used, wherein the gearwheel (22) is adapted to be placed between the first turn plate (20) and the second turn plate (24) in a first position or a second position, wherein in the first position the base is oriented in a first direction relative to the first and second turn plates (20, 24) and the cup extends beyond the first turn plate (20), and wherein in the second position the base is oriented in a second direction opposite the first direction relative to the first and second turn plates (20,24) and the cup extends beyond the second turn plate (24).

2. The adjustment arrangement according to claim 1, wherein the adjustment arrangement (16) is adapted to accommodate a tele lens (92) in the first position of the gearwheel (22).

3. The adjustment arrangement according to claim 1, wherein the adjustment arrangement is adapted to accommodate an ultra wide lens (90) in the second position of the gearwheel (22).

4. The adjustment arrangement according to claim 1, wherein the adjustment arrangement (16) is adapted to accommodate gearwheels (22) of different heights.

5. The adjustment arrangement according to claim 1, wherein the adjustment arrangement comprises a stick (26) for turning the gearwheel (22).

6. The adjustment arrangement according to claim 1, wherein the cup includes a radially outer flange captured between the first and second turn plates.

7. The adjustment arrangement according to claim 6, wherein teeth are arranged around a circumference of the flange.

8. The adjustment arrangement according to claim 7, wherein the adjustment arrangement comprises a sprocket stick (26) having teeth meshing with the gearwheel (22).

9. The adjustment arrangement according to claim 1, wherein the base is configured to support the camera with the camera inside the cup when the gearwheel is in the first position, and the base is configured to support the camera with the camera outside the cup when the gearwheel is in the second position.

10. A camera arrangement comprising a camera (12) and an adjustment arrangement (16) according to claim 1.

11. The camera arrangement according to claim 10, wherein the camera (12) is enclosed by the housing (14).

12. The camera arrangement according to claim 10, wherein the adjustment arrangement (16) is adapted to accommodate a tele lens (92) in the first position of the gearwheel (22).

13. The camera arrangement according to claim 10, wherein the adjustment arrangement is adapted to accommodate an ultra wide lens (90) in the second position of the gearwheel (22).

14. The camera arrangement according to claim 10, wherein the adjustment arrangement (16) is adapted to accommodate gearwheels (22) of different heights.

15. The camera arrangement according to claim 10, wherein the adjustment arrangement comprises a stick (26) for turning the gearwheel (22).

16. The camera arrangement according to claim 10, wherein the cup includes a radially outer flange captured between the first and second turn plates.

17. The camera arrangement according to claim 16, wherein teeth are arranged around a circumference of the flange.

18. The camera arrangement according to claim 17, wherein the adjustment arrangement comprises a sprocket stick (26) having teeth meshing with the gearwheel (22).

19. The camera arrangement according to claim 10, wherein the camera is mounted on the base with the camera inside the cup when the gearwheel is in the first position, and the camera is mounted on the base with the camera outside the cup when the gearwheel is in the second position.

20. A dome camera comprising a camera arrangement according to claim 8.

* * * * *